(12) United States Patent
Sugihara

(10) Patent No.: US 8,144,551 B2
(45) Date of Patent: Mar. 27, 2012

(54) REPRODUCING CONTROL DEVICE HAVING RESUMING FUNCTION

(75) Inventor: Shogo Sugihara, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 1572 days.

(21) Appl. No.: 11/468,810

(22) Filed: Aug. 31, 2006

(65) Prior Publication Data

US 2007/0192458 A1   Aug. 16, 2007

(30) Foreign Application Priority Data

Feb. 16, 2006 (JP) .................................. 2006-39871

(51) Int. Cl.
*G11B 21/08* (2006.01)

(52) U.S. Cl. .................. 369/30.23; 369/30.24; 709/223; 710/10

(58) Field of Classification Search ............... 369/30.24, 369/30.23, 30.1–30.18, 30.27; 709/223, 709/224, 225, 226, 227, 228; 710/5, 8, 9, 710/10; 700/94

See application file for complete search history.

(56) References Cited

U.S. PATENT DOCUMENTS

| | | | |
|---|---|---|---|
| 6,388,961 B1 * | 5/2002 | Ijichi ......................... | 369/30.36 |
| 6,430,120 B1 * | 8/2002 | Chritz et al. ............... | 369/30.12 |
| 6,781,979 B1 * | 8/2004 | Ebata et al. .................. | 370/338 |
| 7,016,268 B2 * | 3/2006 | Yoshida et al. ............. | 369/30.24 |
| 7,099,239 B2 * | 8/2006 | Ogikubo .................... | 369/30.23 |
| 7,307,935 B2 * | 12/2007 | Kusano et al. ............. | 369/53.31 |
| 2003/0142596 A1 * | 7/2003 | Yoshioka ................... | 369/30.22 |
| 2009/0187678 A1 * | 7/2009 | Itoh et al. ........................ | 710/20 |
| 2010/0287258 A1 * | 11/2010 | Takeuchi ..................... | 709/217 |

FOREIGN PATENT DOCUMENTS

| | | |
|---|---|---|
| JP | 2003-298975 | 10/2003 |
| JP | 2005-032297 | 2/2005 |

* cited by examiner

*Primary Examiner* — Tan X Dinh
(74) *Attorney, Agent, or Firm* — Renner, Otto, Boisselle & Sklar, LLP

(57) ABSTRACT

A battery charger includes: a resume information table for storing resume information about contents to be started to be reproduced with a portable player being connected to the battery charger; a writing unit that writes resume information about a tune being reproduced just before the portable player is disconnected from the battery charger into the resume information table; and an instructing unit that reads the resume information stored in the resume information table when the portable player is connected to the battery charger, and transmits an instruction for reproducing a specified tune to the portable player.

10 Claims, 18 Drawing Sheets

FIG. 2B

| CONTENTS INFORMATION DB |
|---|
| CONTENTS INFORMATION I11 |
| CONTENTS INFORMATION I12 |
| CONTENTS INFORMATION I13 |
| CONTENTS INFORMATION I14 |
| . |
| . |
| CONTENTS INFORMATION I1n |

FIG. 2C

| CONTENTS INFORMATION I1n |
|---|
| FILE NAME |
| TUNE NAME |
| ARTIST NAME |
| ALBUM NAME |
| GENRE NEME |
| CONTENTS TIME |
| CONTENTS ID |

RESUME INFORMATION TABLE 302A

| LIST STRUCTURING CONDITION INFORMATION | | | | | TUNE INFORMATION | | OPERATING STATE INFORMATION |
|---|---|---|---|---|---|---|---|
| ATTRIBUTE INFORMATION | FIRST LIST SELECTING VALUE | | SECOND LIST SELECTING VALUE | | | | |
| | NUMBER | TOTAL NUMBER | NUMBER | TOTAL NUMBER | NUMBER | TOTAL NUMBER | |
| ARTIST | 2 | 6 | 3 | 4 | 5 | 10 | REPRODUCE |

FIG. 6

(a)
| ARTIST NAME LIST |
|---|
| AAA |
| BBB |
| CCC |
| DDD |
| EEE |
| FFF |

(b)
| ALBUM NAME LIST |
|---|
| ZZZ |
| YYY |
| XXX |
| WWW |

(c)
| TUNE NAME LIST |
|---|
| aaa |
| bbb |
| ccc |
| ddd |
| eee |
| fff |
| ggg |
| hhh |
| iii |
| jjj |

FIG. 10

RESUME INFORMATION TABLE 302B

| SERIAL NUMBER | LIST STRUCTURING CONDITION INFORMATION | | | | | TUNE INFORMATION | | OPERATING STATE INFORMATION |
|---|---|---|---|---|---|---|---|---|
| | ATTRIBUTE INFORMATION | FIRST LIST SELECTING VALUE | | SECOND LIST SELECTING VALUE | | | | |
| | | NUMBER | TOTAL NUMBER | NUMBER | TOTAL NUMBER | NUMBER | TOTAL NUMBER | |
| 00000001 | ARTIST | 10 | 85 | 1 | 1 | 2 | 4 | PLAY |
| 00080003 | ALBUM | 53 | 257 | --- | --- | 6 | 12 | PAUSE |
| 10680205 | PLAY LIST | 2 | 13 | --- | --- | 51 | 125 | PLAY |

FIG. 13

RESUME INFORMATION TABLE 302C

| LIST STRUCTURING CONDITION INFORMATION | | | TUNE INFORMATION | OPERATING STATE INFORMATION |
|---|---|---|---|---|
| ATTRIBUTE INFORMATION | FIRST LIST SELECTING VALUE | SECOND LIST SELECTING VALUE | | |
| ARTIST | BBB | XXX | eee | REPRODUCE |

REPRODUCING CONTROL DEVICE HAVING RESUMING FUNCTION

BACKGROUND OF THE INVENTION

1. Field of the Invention

The present invention relates to a reproducing control device and a reproducing control program that transmit a contents reproducing instruction to a contents reproducing device. Further, the present invention relates to the contents reproducing device that reproduces contents.

2. Description of the Related Art

Portable players (contents reproducing devices), which have HDD (hard disc drive) or flash memories for storing a plurality of contents (for example, music (tune) data) therein, are used. In the case where users reproduce contents stored in portable players and listen to music in their rooms, the portable players are connected to battery chargers (reproducing control devices) connected to amplifiers. The battery chargers have a function for supplying a power supply voltage to batteries of the portable players, and a function for transmitting audio signals from the portable players to the amplifiers. The audio signals reproduced in the portable players are transmitted via the battery chargers to the amplifiers, and the music is reproduced in the amplifiers. The portable players are normally provided with a resume function. The resume function is such that when a certain tune A which is being reproduced is stopped based on a users operation or when the power supply of the portable player is turned off, the tune A and its stop position (these are called resume information) are stored in a table in a RAM of the portable player, and when the user inputs a reproducing instruction into the portable player at the next time, the tune A whose reproduction is stopped at the last time is started to be played from the stop position.

The above type of portable player has the following problems. When the reproduction of the tune A is stopped with the portable player being connected to the battery charger, the portable player stores the resume information about the tune A in the table. When the portable player is removed from the battery charger and another tune B is played in the disconnected state, the resume information about the tune A stored in the table is deleted. When the reproduction of the tune B is stopped in the disconnected state, the resume information about the tune B is stored in the table. When the portable player is connected to the battery charger again and the reproduction is started, the resume information about the stopped tune B is stored in the table in the disconnected state. For this reason, the portable player starts the reproduction of the tune B. Even in the case where the user reproduces another tune B with the battery charger being disconnected from the portable player, when they are connected again, the tune A which was reproduced in the connected state at the last time is demanded to be automatically started to be reproduced. This demand is created due to such a circumstance that a tune to which the user listens in the disconnected state (namely, outside of the room) is different from a tune to which the user listens in the connected state (namely, in the room) depending on user's mood. In a conventional manner, however, since the resume information about the tune A is deleted at the time when the tune B is reproduced in the disconnected state, this demand cannot be realized.

SUMMARY OF THE INVENTION

It is an object of the present invention to provide a reproducing control device where even in the case where a tune A is reproduced with a contents reproducing device being connected to the reproducing control device, and then another tune B is reproduced with the contents reproducing device being disconnected from the reproducing control device, when the contents reproducing device is again connected to the reproducing control device, the reproduction of the tune A can be automatically started.

A reproducing control device according to a preferable embodiment of the present invention includes: a connecting unit that is connected to a contents reproducing device which reproduces contents selected from a plurality of contents; a receiving unit that receives the reproduced contents from the contents reproducing device; a resume information storage unit that stores resume information about contents to be started to be reproduced with the contents reproducing device being connected to the connected unit; a connection determining unit that determines whether the connecting unit is connected to the contents reproducing device; a writing unit that writes the resume information about the contents reproduced just before the contents reproducing device is disconnected from the connecting unit into the resume information storage unit; and an instructing unit that, when the connection determining unit determines that the connecting unit is connected to the contents reproducing device, reads the resume information stored in the resume information storage unit so as to transmit an instruction for reproducing contents specified by the resume information to the contents reproducing device.

When the contents reproducing device reproduces a tune A with it being connected to a reproducing control device and the connection therebetween is released during the reproduction of the tune A, resume information about the tune A is written into the resume information storage unit. The contents reproducing device reproduced a tune B in the disconnected state. Thereafter, they are reconnected, the reproducing control device reads the resume information about the tune A reproduced just before the connection is released from the resume information storage unit so as to transmit an instruction for reproducing the tune A to the contents reproducing device. Even in the case where the tune B is reproduced in the disconnected state, therefore, the contents reproducing device can automatically start to reproduce the tune A reproduced just before the connection is released at the last time. "The tune A which is reproduced just before the connection is released" means the tune A reproduced at the time of releasing the connection, and the tune A which is reproduced just before the tune is stopped if the tune is stopped when the connection is released.

Preferably, the connection determining unit further determines whether the connecting unit is disconnected from the contents reproducing device, and when the connection determining unit determines that the connecting unit is disconnected from the contents reproducing device, the writing unit writes the resume information into the resume information storage unit.

When the resume information is written into the resume information storage unit every time the tune number or the like is changed, a load of the reproducing control device increased. The resume information is, however, written into the resume information storage unit only when the disconnection is determined, so that the load of the reproducing control device can be reduced.

Preferably, the reproducing control device further includes an input unit that inputs a resume reproducing instruction therein. When the connection determining unit determines that the connecting unit is connected to the contents reproducing device and the resume reproducing instruction is input into the input unit, the instructing unit transmits the contents reproducing instruction specified by the resume information to the contents reproducing device.

The reproducing control device does not transmit the instruction for reproducing the contents specified by the resume information read from the resume information storage unit to the contents reproducing device until the resume reproducing instruction is input. As a result, when the resume reproducing instruction is not input, the tune which was reproduced in the disconnected state can be reproduced continuously after the connection.

Preferably, the resume information storage unit includes contents specifying information for specifying contents and list specifying information for specifying a list including the contents as the resume information. The instructing unit reads the contents specifying information and the list specifying information from the resume information storage unit so as to transmit them to the contents reproducing device.

Since the list which is structured just before the connection is released can be restructured, the contents reproducing device can sequentially reproduce the contents included in the list.

Preferably, the reproducing control device further includes: a change determining unit that determines whether the contents recorded in the contents reproducing device connected to the connecting unit are changed from contents recorded in the contents reproducing device just before the connection is released. When the change determining unit determines that the contents are not changed, the instructing unit transmits the instruction for reproducing the contents specified by the resume information to the contents reproducing device. When the change determining unit determines that the contents are changed, the instructing unit does not transmit the instruction for reproducing the contents specified by the resume information to the contents reproducing device.

When the contents recorded in the contents reproducing device are changed, the reproducing control device does not transmit the instruction for reproducing the contents specified by the resume information to the contents reproducing device. As a result, a malfunction such that the contents reproducing device reproduces improper contents can be prevented.

Preferably, the resume information storage unit can store identification information about one or a plurality of contents reproducing device(s) and the resume information related with the identification information therein. The reproducing control device further includes: an identification information acquiring unit that acquires identification information about the contents reproducing device connected to the connecting unit from the contents reproducing device; and an identification information determining unit that determines whether the acquired identification information matches the identification information stored in the resume information storage unit. When the identification information determining unit determines that two pieces of the information match, the instructing unit transmits an instruction for reproducing the contents specified by the resume information related with the matched identification information to the contents reproducing device.

Even when a plurality of contents reproducing device share one reproducing control device, the respective contents reproducing device can start to reproduce the contents reproduced just before the connection is released at the last time according to the resume information. A malfunction of another contents reproducing device due to the resume information about a certain contents reproducing device can be prevented.

Further, the resume information about the contents reproducing device can be prevented from being deleted by another contents reproducing device.

A battery charger according to a preferred embodiment of the present invention includes: any one of the above reproducing control devices; a power source supplying circuit that supplies a power supply voltage to the contents reproducing device; and a transmitting unit that transmits the contents received by the receiving unit to an amplifier to be connected to the outside.

An amplifier according to a preferred embodiment of the present invention where the contents include audio includes: any one of the above reproducing control devices; and an amplifying unit that amplifies the audio received by the receiving unit.

A reproducing control program according to a preferred embodiment of the present invention which is an operating program of a reproducing control device capable of being connected to a contents reproducing device for reproducing contents selected from a plurality of contents. The program allows a computer to execute: the receiving step of receiving the reproduced contents from the contents reproducing device; the connection determining step of determining whether the reproducing control device is connected to the contents reproducing device; the writing step of writing resume information about the contents reproduced just before the contents reproducing device is disconnected from the reproducing control device into a resume information table; the reading step of, when the determination is made that the reproducing control device is connected to the contents reproducing device, reading the resume information stored in the resume information table; and the instructing step of transmitting an instruction for reproducing contents specified by the read resume information to the contents reproducing device.

A contents reproducing device according to a preferred embodiment of the present invention includes: a reproducing unit that reproduces contents selected from a plurality of contents; a connecting unit that is connected to an external device as a transmission destination of the contents; a transmitting unit that transmits the reproduced contents to the external device; a first resume information storage unit that stores resume information about contents to be started to be reproduced with the connecting unit being disconnected from the external device therein; a second resume information storage unit that stores resume information about contents to be started to be reproduced with the connecting unit being connected to the external device; a connection determining unit that determines whether the connecting unit is connected to the external device; and a writing unit that writes resume information about contents being reproduced by the reproducing unit just before the connecting unit is disconnected from the external device into the second resume information storage unit. When the connection determining unit determines that the connecting unit is connected to the external device, the reproducing unit reads the resume information stored in the second resume information storage unit and starts to reproduce contents specified by the resume information.

According to the present invention, the contents which is reproduced just before the contents reproducing device is disconnected from the reproducing control device at the last time can be started to be reproduced by the contents reproducing device when both of them are connected.

BRIEF DESCRIPTION OF THE DRAWINGS

FIG. 2B is a diagram illustrating a data structure of a contents information database;

FIG. 2C is a block diagram illustrating a data structure of contents information.

FIGS. 6(*a*) to 6(*c*) are diagrams illustrating respective lists;

FIG. 10 is a diagram illustrating a resume information table;

FIG. 13 is a diagram illustrating the resume information table;

DETAILED DESCRIPTION OF THE PREFERRED EMBODIMENTS

Figure 1:
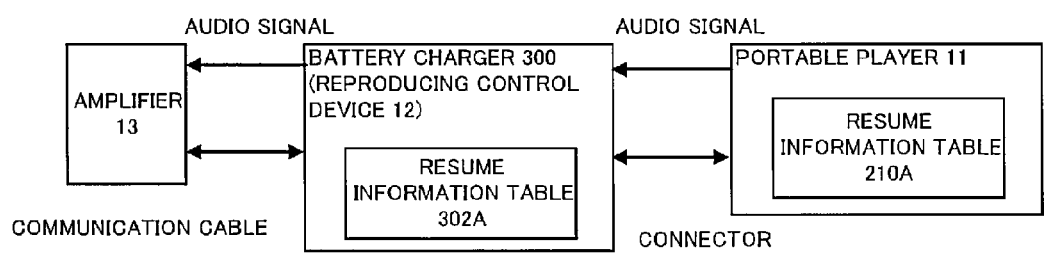
FIG. 1 is a block diagram illustrating a contents reproducing system according to a preferable embodiment of the present invention.
Figure 2A:
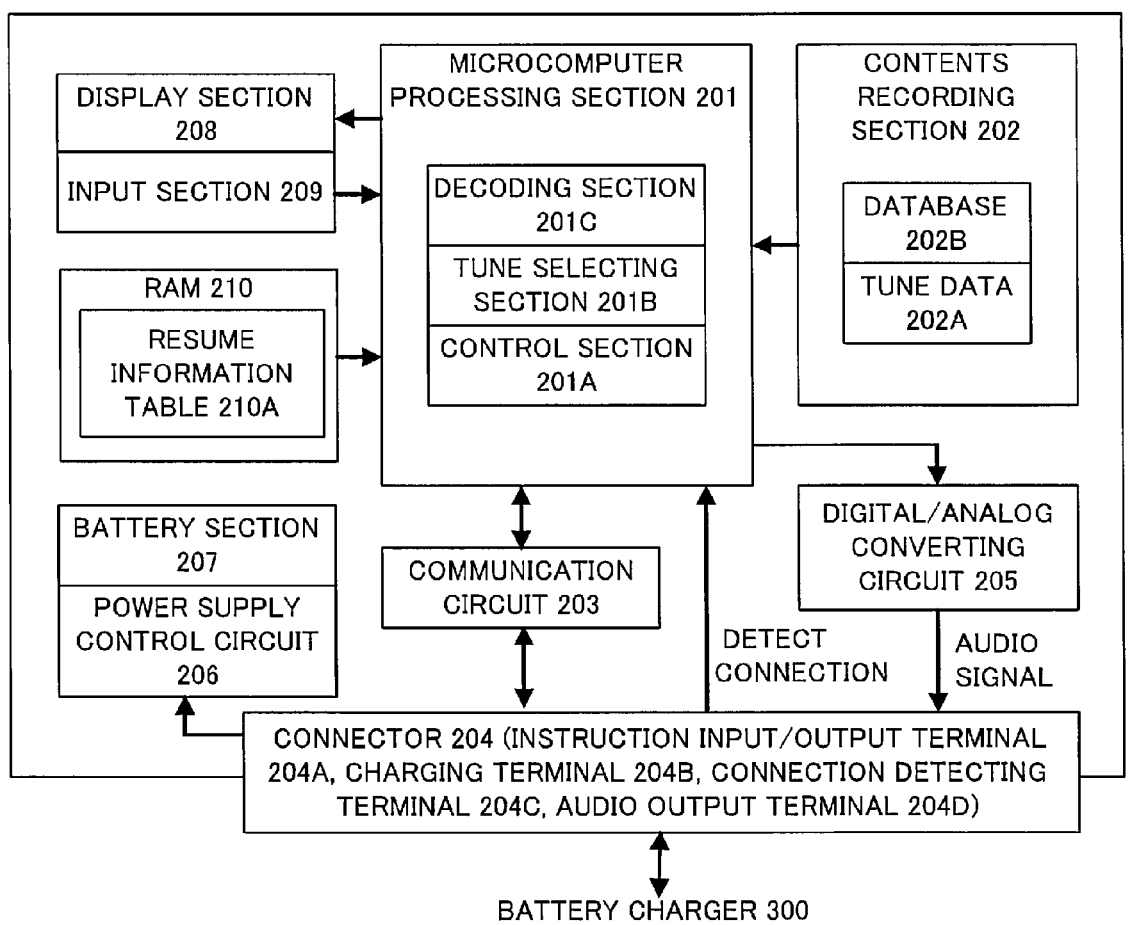
FIG. 2A is a block diagram illustrating a constitution of a portable player 11.
Figure 3:
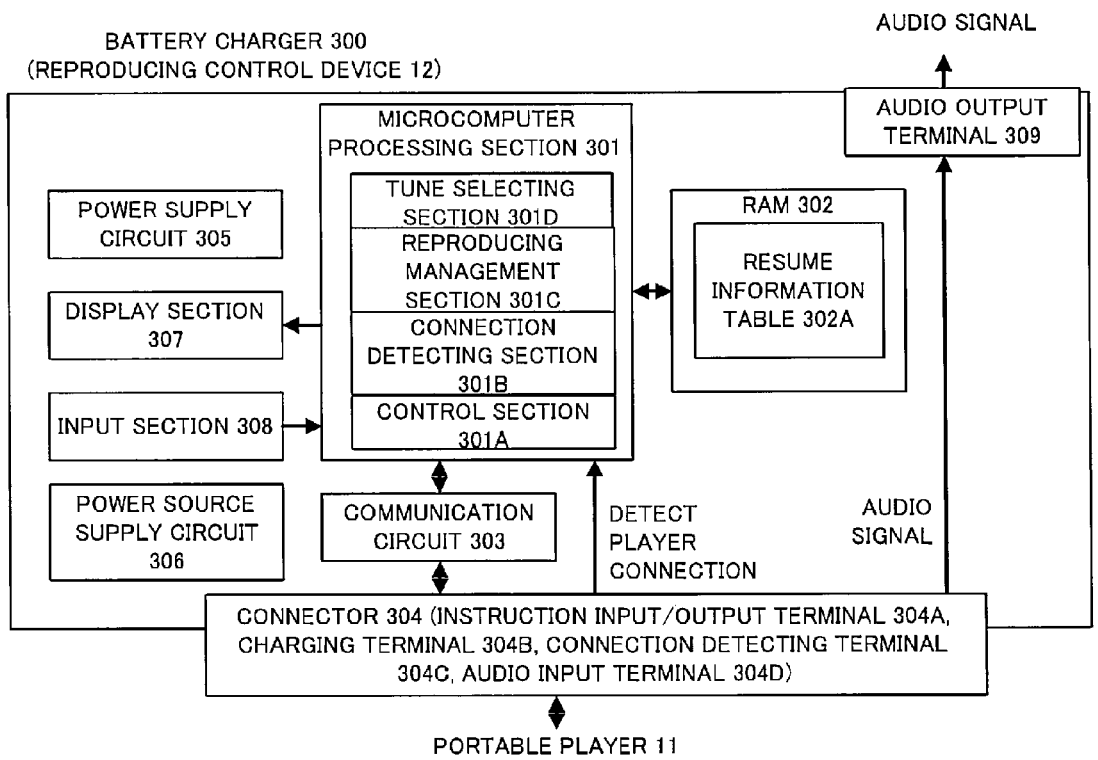
FIG. 3 is a block diagram illustrating a constitution of a battery charger 300.

Preferred embodiments of the present invention are concretely explained below with reference to the drawings, but the present invention is not limited to the embodiments. FIG. 1 is a schematic diagram illustrating a contents reproducing system having a reproducing control device 12 according to the preferred embodiment of the present invention. The contents reproducing system has a contents reproducing device 11 (for example, a portable player whose details are shown in FIG. 2A), a reproducing control device 12 (for example, a battery charger 300 whose details are shown in FIG. 3), and an amplifier 13. The reproducing control device 12 is typically provided in the battery charger 300 that supplies a power supply voltage to a battery of the portable player 11. The arrangement is not, however, limited to this, and the reproducing control device 12 may be provided into another device (the amplifier 13 or PC). The contents are a collective term of music (tune), projected image and/or still image. They may be digital or analog and compressed or uncompressed data. The embodiment explains an example where the contents are music (audio).

The portable player 11 is connected to the reproducing control device 12 via a connector for audio and communication. The reproducing control device 12 is connected to the amplifier 13 via a cable for audio (and communication as the need arises). The reproducing control device 12 transmits an instruction for reproducing a tune selected by a user to the portable player 11. The portable player 11 which receives the reproducing instruction reproduces the specified tune and transmits an audio signal to the reproducing control device 12. The reproducing control device 12 transmits the audio signal received from the portable player 11 to the amplifier 13. The amplifier 13 amplifies the audio signal received from the reproducing control device 12 and reproduces music via a speaker, not shown.

The reproducing control device 12 has a resume information table 302A. When the contents reproducing device 11 reproduces a tune A with it being connected to the reproducing control device 12 and then the contents reproducing device 11 is disconnected from the reproducing control device 12, resume information about the tune A (for example, the information about the tune A and information about tune list including the tune A) is written into the resume information table 302A. Thereafter, even in the case where another tune B is reproduced with the portable player 11 is disconnected from the reproducing control device 12, when the portable player 11 is reconnected to the reproducing control device 12, the reproducing control device 12 reads the resume information stored in the resume information table 302A, and instructs the portable player 11 to start reproduction of the tune A.

The portable player 11 also has a resume information table 210A. Not particularly limited, but when the portable player 11 stops the reproduction of the tune B with it not being connected to the reproducing control device 12, the resume information about the tune B (for example, the information about the tune B and information about a tune list including the tune B) can be stored in the resume information table 210A. The present invention is not limited to this.

FIG. 2A is a schematic diagram illustrating a constitution of the portable player 11. The portable player 11 includes a microcomputer processing section 201, a contents recording section 202, a communication circuit 203, a connector 204, a digital/analog converting circuit 205, a power supply control circuit 206, a battery section 207, a display section 208, an input section 209 and a RAM 210. The microcomputer processing section 201 includes a control section 201A, a tune selecting section 201B and a decoding section 201C. The connector 204 includes an instruction input/output terminal 204A, a charging terminal 204B, a connection detecting terminal 204C and an audio output terminal 204D.

The control section 201A controls respective operations of the portable player 11 based on respective instructions received from the reproducing control device 12 via the instruction input/output terminal 204A and the communication circuit 203. The tune selecting section 201B selects a tune specified from a plurality of tunes stored in the contents recording section 202. The decoding section 201C acquires tune data from the contents recording section 202 and decodes them so as to give the decoded data to the digital/analog converting circuit 205. The digital/analog converting circuit 205 converts the music data from the decoding section 201C into an analog audio signal, and outputs the analog audio signal to the reproducing control device 12 via the audio output terminal 204D. The power supply control circuit 206 gives the power supply voltage supplied from the battery charger 300 via the charging terminal 204B to the battery section 207, and supplies the power supply voltage with which the battery section 207 is charged to the respective sections of the portable player 11. The display section 208 includes an LCD or the like, and displays an operating state or the like of the portable player 11. The input section 209 inputs the tune selecting instruction, the reproducing instruction and the like from the user therein, and gives the instructions to the microcomputer processing section 201.

The contents recording section 202 stores a plurality of contents (tune data) 202A, and an HDD and a nonvolatile memory such as a flash memory can be typically adopted (hereinafter, HDD 202) as the contents recording section 202. The HDD 202 stores a contents information database 202B shown in FIG. 2B (hereinafter, contents information DB) therein. The contents information DB manages contents information about all the contents stored in the HDD 202. That is to say, the contents information DB includes contents information I11 to I1n relating to all the contents M11 to M1n stored in the HDD 202.

FIG. 2C illustrates details of the contents information. The contents information I1n typically includes a file name, a contents name (tune name), an artist name, an album name, a genre name, a contents length (time) and a contents ID.

The RAM 210 stores the resume information table 210A therein. The resume information table 210A is, for example, a table for storing resume information about a tune stopped with the portable player 11 not being connected to the battery charger 300.

FIG. 3 is a schematic diagram illustrating a constitution of the battery charger 300 (reproducing control device 12). The battery charger 300 has a microcomputer processing section 301, a RAM 302, a communication circuit 303, a connector 304, a power supply circuit 305, a power source supply circuit 306, a display section 307, an input section 308 and an audio output terminal 309. The microcomputer processing section 301 includes a control section 301A, a connection detecting section 301B, a reproduction management section 301C and a tune selecting section 301D. The connector 304 includes an instruction input/output terminal 304A, a charging terminal 304B, a connection detecting terminal 304C and an audio input terminal 304D. The RAM 302 stores the resume information table 302A.

The control section 301A executes programs stored in a ROM, not shown, so as to control the entire operation of the battery charger 300. The connection detecting section 301B detects whether the connector 304 is connected to the connector 204 of the portable player 11, and/or whether the connector 304 is disconnected from the connector 204 based on, for example, a change in a voltage value to be input into a port of the microcomputer processing section 301 via the connection detecting terminals 304C and 204C. The reproducing management section 301C receives a reproducing tune number and an operating state information from the portable player 11 so as to temporarily store them in the RAM 302. When the portable player 11 is disconnected from the battery charger 300, the reproducing management section 301C writes the tune number and the operating state information of the RAM 302 and list structuring condition information (mentioned later) into the resume information table 302A. When a list and a tune are selected by a user's operation of the input section 308, the tune selecting section 301D transmits information for specifying the list and tune to the portable player 11. The tune selecting section 301D writes the information for specifying the list selected by the user's instruction into the resume information table 302A. The tune selecting section 301D reads the resume information from the resume information table 302A, so as to transmit the instruction for reproducing the tune specified by the resume information to the portable player 11.

The communication circuit 303 transmits information and instructions between the microcomputer processing section 301 and the connector 304. The connector 304 is connected to the connector 204 of the portable player 11, and the terminals 204A to 204D are connected to the terminals 304A to 304D, respectively. The power supply circuit 305 is supplied with a commercial alternating current (direct current), and supplies a power supply voltage to the respective section of the battery charger 300. The power source supply circuit 306 supplies a power supply voltage to the portable player 11 via the charging terminal 304B. The display section 307 displays the operating state of the portable player 11 (play, stop, pause, fast-feed, fast-rewind, random play), the contents information about the on-playing tune, the lists for selecting tunes and the like. The display section 307 is, for example, LCD or OSD. Instructions from the user are input into the input section 308. The input section 308 is, for example, a play button, stop button, a tune selecting button and the like. An audio signal is input into the audio input terminal 304D from the portable player 11. The audio output terminal 309 outputs the audio signal from the audio input terminal 304D to the amplifier 13.

Figures 4, 5:
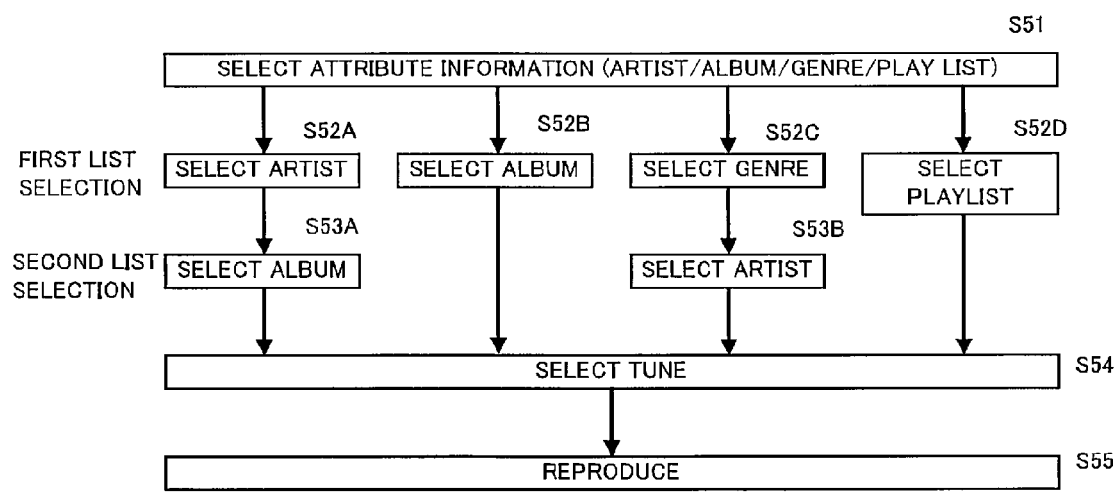
FIG. 4 is a diagram illustrating a resume information table.
FIG. 5 is a diagram illustrating a procedure for selecting tunes.

In the resume information table 302A, when the portable player 11 is connected to the battery charger 300, the resume information about the content to be played by the portable player 11 is stored. The resume information table 302A is shown in FIG. 4.

The resume information table 302A includes list structuring condition information, tune information and operating state information. The list structuring condition information is used for restructuring a list structured just before the battery charger 300 is disconnected from the portable player 11 when the battery charger 300 is reconnected to the portable player 11. The list structuring condition information includes attribute information, a first list selecting value and a second list selecting value. The attribute information represents an attribute to which an attention is paid when the list is created, and is selected from artist, album, genre, play list and the like. That is to say, as shown in FIG. 5, when a tune is selected, the attribute information (artist, album, genre or play list) is selected at S51, and the selected attribute information is written into attribute information in the resume information table. The first list selecting value is information which represents a value in values specified by the selected attribute information to which an attention is paid when a next list is created, and includes a number (order) and a total number. Concretely, when the artist is selected at S51, as shown in FIG. 6(a), an artist name list including six artist names, for example, is displayed. The first list selecting value is used for specifying an artist name selected from the artist name list by the total number (six) and the number (when BBB, the second).

The second list selecting value is information which represents a value in the values specified by the selected first list selecting value to which an attention is paid when a next list is created only in the case where the first list selecting value shows the artist and the genre. The second list selecting value includes the number (order) and the total number. Concretely, when the artist name is specified at S52A, as shown in FIG. 6(b), the album name list including four album names, for example, is displayed. The second list selecting value is used for selecting an album name from the album name list according to the total number (four) and the number (when XXX, the third), for example.

The tune information is information about a tune played by the portable player 11 just before the battery charger 300 is disconnected from the portable player 11. The tune information is information for selecting a tune from the list specified by the list structuring condition information according to the number (order) and the total number. When the value is selected at S53A, S52B, S53B or S52D, as shown in FIG. 6(c), the tune name list including the tune names is created, and the user selects a desired tune name. The portable player 11 continuously reproduces the tunes in the order of the tune name list shown in FIG. 6(c), but every time when tunes are changed, the numbers of the tunes are transmitted from the portable player 11 to the battery charger 300. When the connection is released, the number of the tune reproduced just before the disconnection is written as tune information.

The operating state information is information which represents the operating state of the portable player 11 just before the battery charger 300 is disconnected from the portable player 11. When the battery charger 300 is connected to the portable player 11, the operating state information is transmitted to the portable player 11, and the operating state is reproduced based on the operating state information received by the portable player 11.

The operation of the contents reproducing system is explained below. The tune selecting process is explained with reference to FIGS. 7A and 7B. A list of the attribute information is displayed on the display section 307 of the battery charger 300 (S701), and the user selects the attribute information (in this embodiment, artist) using the input section 308 (S702). The attribute information is temporarily stored in the RAM 302. The microcomputer processing section 301 transmits an instruction for selecting the attribute information (artist) to the portable player 11 (S703). The microcomputer processing section 201 of the portable player 11 extracts an artist name from the contents information DB, and creates an artist name list of FIG. 6(a) (S751). The microcomputer processing section 301 requests transmission of the total number of the artist names included in the artist name list (S704, the number post request). The microcomputer processing section 201 returns the tonal number (six) of the artist names (S752). The microcomputer processing section 301 receives the total number of the artist names so as to temporarily store it as the total number of the first list selecting value into the RAM 302. The microcomputer processing section 301 requests transmission of the artist name list (S705), and the microcomputer processing section 201 returns the artist name list (S753). The microcomputer processing section 301 receives the artist name list (S705), and displays it on the display section 308 (S706).

When a desired artist name (for example, BBB) is selected from the artist name list (S707), the microcomputer processing section 301 transmits a list selecting command (second) (S708) and temporarily stores 2 as the number of the first list selecting value into the RAM 302. The microcomputer processing section 201 receives the list selecting command, and extracts the album name of the tune with artist name BBB from the contents information DB so as to create an album name list (S754). The microcomputer processing section 301 requests posting of the total number of the album names included in the album name list (S709), and the microcomputer processing section 201 posts the total number (4) of the album names (S755). The microcomputer processing section 301 receives the total number of the album names and temporarily stores it as the total number of the second list selecting value into the RAM 302. The microcomputer processing section 301 requests transmission of the album name list (S710), the microcomputer processing section 201 returns the album name list (S756). The microcomputer processing section 301 receives the album name list (S710) so a to display it on the display section 308 (S711).

When a desired album name (for example, XXX) is selected from the album name list (S712), the microcomputer processing section 301 transmits the list selecting command (third) (S713) and temporarily stores 3 as the number of the second list selecting value into the RAM 302. The microcomputer processing section 201 receives the list selecting command, and extracts names of tunes in albums XXX from the contents information DB so as to create a tune name list (S757). The microcomputer processing section 301 requests posting of the total number of the tune names included in the tune name list (S714), and the microcomputer processing section 201 posts the total number of the tune names (ten tunes) (S758). The microcomputer processing section 301 receives the total number of the tune names so as to temporarily store it as the total number of the tune information into the RAM 302 (S714). The microcomputer processing section 301 requests transmission of the tune name list (S715), and the microcomputer processing section 201 returns the tune name list (S759). The microcomputer processing section 301 receives the tune name list (S715) so as to display it on the display section 308 (S716).

When a desired tune name (for example, eee) is selected from the tune name list (S717), the microcomputer processing section 301 transmits a tune reproducing instruction (fifth tune) (S718) so as to temporarily store 5 as the number of the tune information into the RAM 302. The portable player 11 receives the tune reproducing instruction, and reads the specified tune eee from the HDD 202 so as to transmit it to the battery charger 300 (S760).

A process for writing resume information into the resume information table 302A after the portable player 11 is disconnected from the battery charger 300 is explained below with reference to FIG. 8. The microcomputer processing section 301 receives the number of the on-playing tune in the tune list and operating state information about the portable player 11 from the portable player 11, so as to temporarily store them into the RAM 302 (S801). Concretely, the portable player 11 continuously reproduces the tunes in the tune name list of FIG. 6(c) sequentially. Every time when a next tune is started to be reproduced, the numbers of tunes in the tune name list is transmitted to the battery charger 300. The battery charger 11 receives the numbers of the tunes so as to temporarily store them into the RAM 302. At this time, the numbers of the tunes which are not now being reproduced are deleted. When the operating state is changed (for example, from play to pause), the portable player 11 transmits operating state information after the change to the battery charger 300. For this reason, the battery charger 300 receives the operating state information so as to temporarily store it into the RAM 302. At this time, the previous operating state information is deleted.

The connection determining section 301B determines whether the portable player 11 is disconnected from the battery charger 300 (the connector 304 is disconnected from the connector 204) (S802). When the portable player 11 is disconnected from the battery charger 300, the microcomputer processing section 301 writes the resume information into the resume information table 302A (S803). Concretely, the microcomputer processing section 301 writes the attribute information, the first list selecting value (the total number and the number) and the second list selecting value (the total number and the number), which are stored in the RAM 302 in the tune selecting process, into the resume information table 302A. The microcomputer processing section 301 writes the number of the tune being reproduced just before the portable player 11 is disconnected from the battery charger 300 and the operating state information about the portable player 11 (information stored into the RAM 302 at S801) into the resume information table 302A.

Figure 9A:
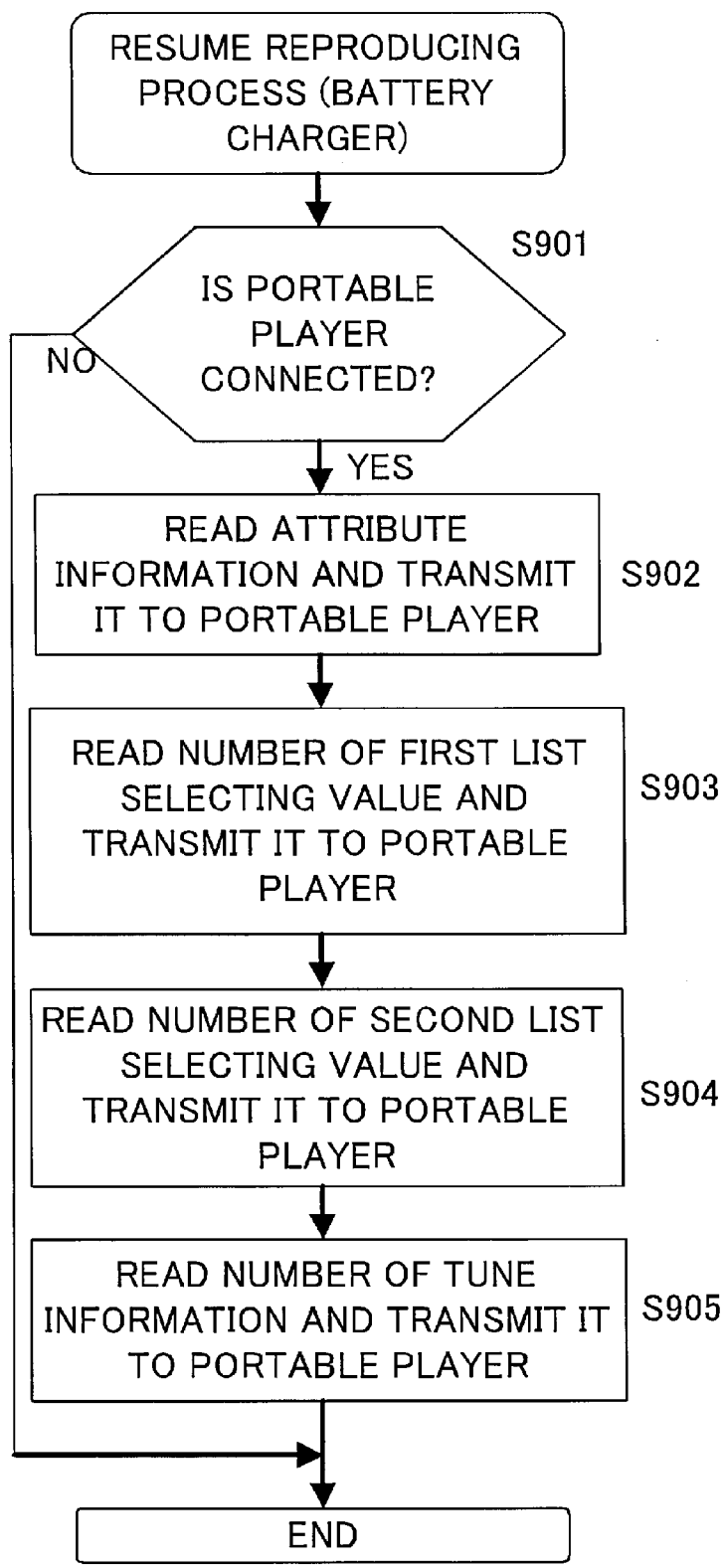
FIG. 9A is a diagram illustrating a resume reproducing process of the battery charger.
Figure 9B:
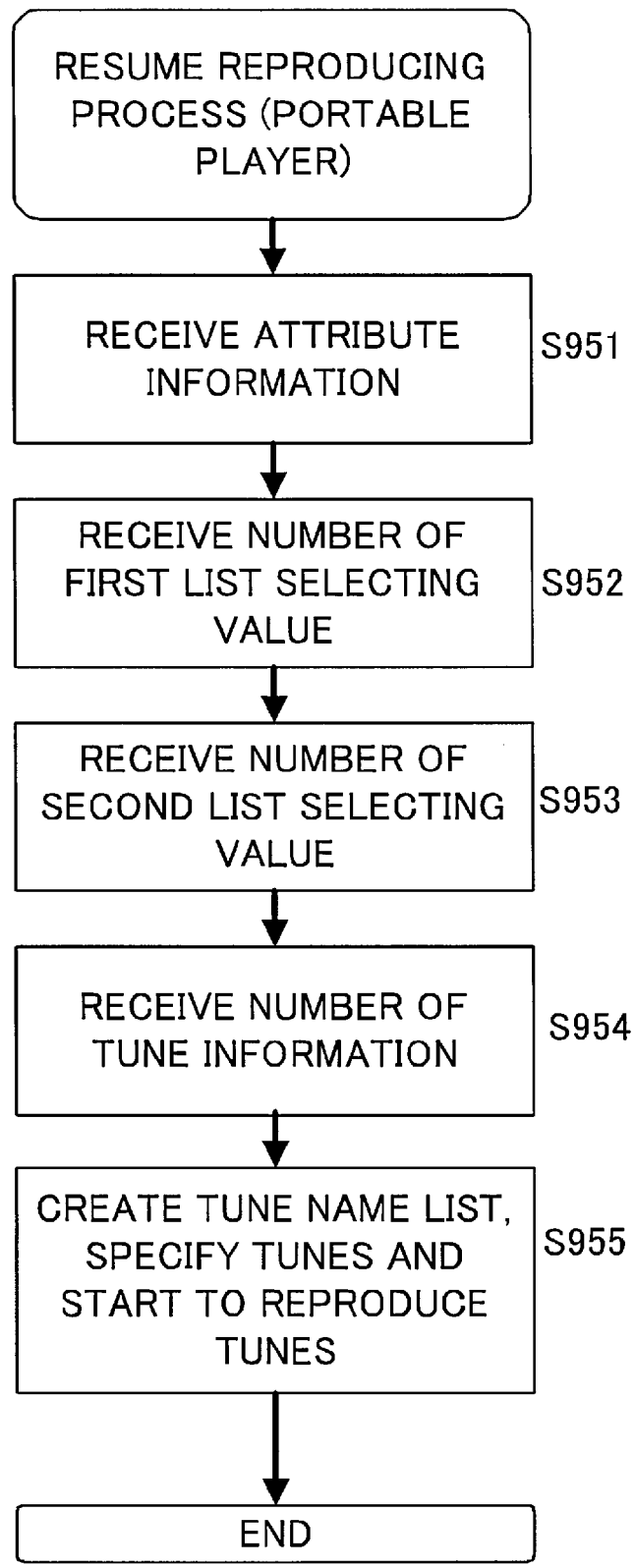
FIG. 9B is a flowchart illustrating a resume reproducing process of the portable player 11.

A process for reproducing the tune reproduced just before the portable player 11 is disconnected from the battery charger 300 and the operating state of the portable player 11 when the portable player 11 is connected to the battery charger 300 is explained below with reference to FIGS. 9A and 9B. The connection determining section 301B determines whether the portable player 11 is connected (the connector 204 is connected to the connector 304) (S901). When the portable player 11 is connected to the battery charger 300, the microcomputer processing section 301 reads the attribute information (artist) from the resume information table 302 so as to transmit it to the portable player 11 (S902). The portable player 11 receives the attribute information (artist) (S951). The microcomputer processing section 301 reads the number (second) of the first list selecting value from the resume information table 302A, and transmit it to the portable player 11 (S903). The portable player 11 receives the number (second) of the first list selecting value (S952). The microcomputer processing section 301 reads the number (third) of the second list selecting value from the resume information table 302A, and transmits it to the portable player 11 (S904). The portable player 11 receives the number (third) of the second list selecting value (S953). The microcomputer processing section 301 reads the number of the tune information from the resume information table 302A, and transmits it to the portable player 11 (S905). The portable player 11 receives the number of the tune information (S954). The microcomputer 201 of the portable player 11 reproduces the tune name list of FIG. 6(c) based on the resume information received at S951 to S953, so as to store it into the RAM 210 (S955). The portable player 11 specifies the tune from the tune name list based on the number of the tune information received at S954 so as to start reproduction of the specified tune (S955).

As the need arises, at S905, the microcomputer processing section 301 reads the operating state information from the resume information table 302, and transmits it to the portable player. The portable player 11 receives the operating state information so as to reproduce the operating state. For example, when the operating state information is random play, the portable player 11 randomly selects the tune from the tune name list so as to be capable of reproducing it.

When the portable player 11 is connected to the battery charger 300, the portable player 11 can start to reproduce the tune which is reproduced just before the portable player 11 is disconnected from the battery charger 300. Since the tune name list is reproduced, the tunes can be continuously played according to the order of the tune name list selected by the user just before the connection is released. Not when the connection is released at S803, but when the portable player 11 starts the reproduction and when the tune number and the operating state information is posted, the resume information may be written into the resume information table 302A. When the reproduction of the tune is stopped, the resume information may be written into the resume information table 302A. The tune information in the resume information table 302 includes the start position (start time), and the play position is transmitted to the portable player 11. As a result, the portable player 11 may start to reproduce the tune from the reproducing position at the time of releasing the connection at the last time. Since the current reproducing position is transmitted from the portable player 11 at every 1 sec., the reproducing position at the time of releasing the connection is written into the resume information table.

Another preferable embodiment of the present invention is explained below. In the previous embodiment, in the case where one battery charger 300 is commonly used by a plurality of the portable players 11, or in the case where when the resume information about a certain portable player is being stored, another portable player is connected, the connected portable player reproduces an irrelevant tune based on the resume information. In this embodiment, the resume information is stored for each portable player, so that such a problem is solved. A problem such that the resume information about a certain portable player is deleted by another portable player is solved. Further, when the tunes recorded in the portable player are changed (including addition and deletion), the numbers of the tunes in the list, the numbers of the album names in the artist name list, and the like are changed. For this reason, when the resume reproducing process is executed, a tune which is different from the tune being reproduced just before the connection is released at the last time is reproduced. In this embodiment, however, this problem is detected and the resume reproducing process is not executed, so that a false operation is prevented. This is explained in detail below.

The resume information table 302B in this embodiment is shown in FIG. 10. The resume information table 302B includes an identification number of the portable player (for example, a serial number or the like) in comparison with the resume information table 302A of FIG. 4. The resume information about each portable player is written so as to be related with each serial number. The serial number is stored into the HDD 202 of the portable player 11 in advance.

Figure 8:
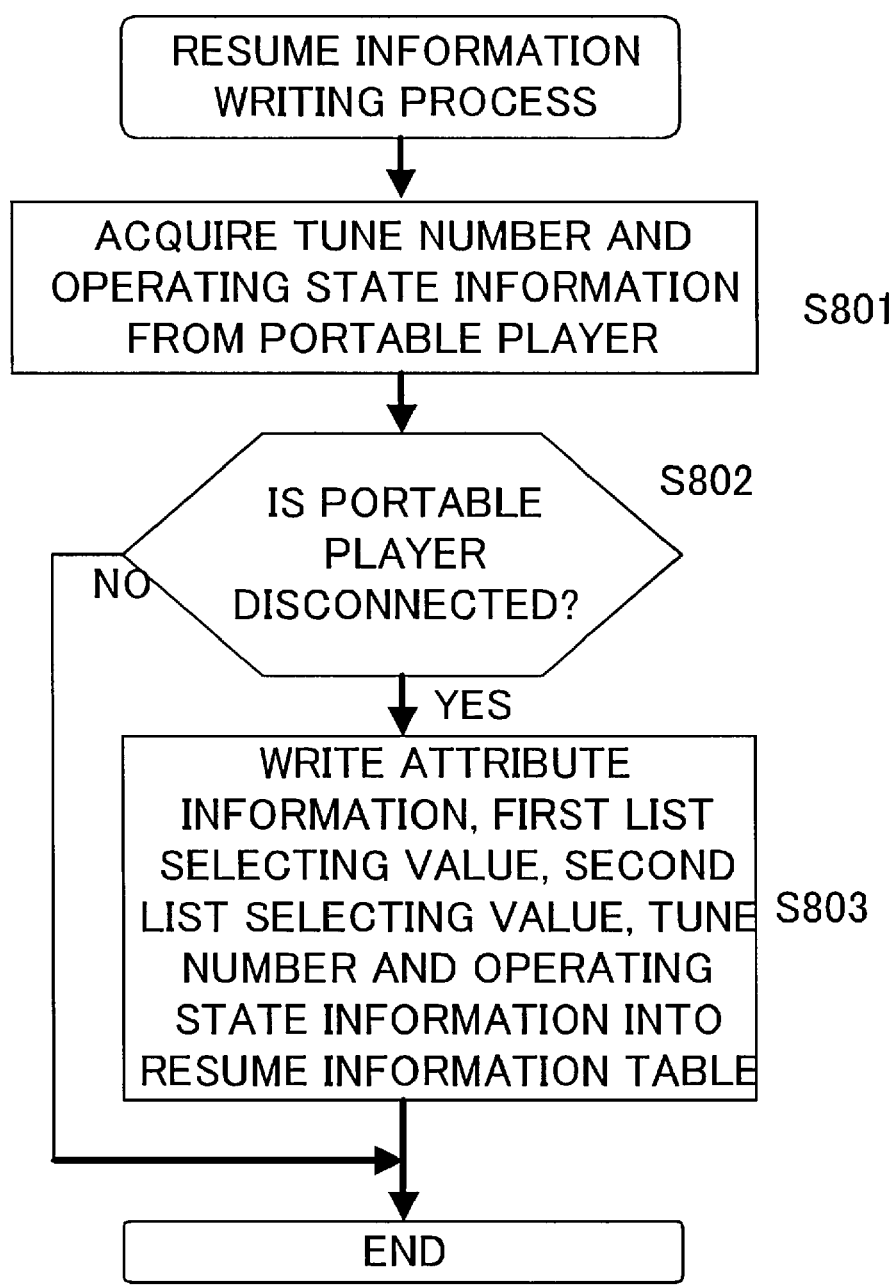
FIG. 8 is a flowchart illustrating a resume information writing process.
Figure 11:
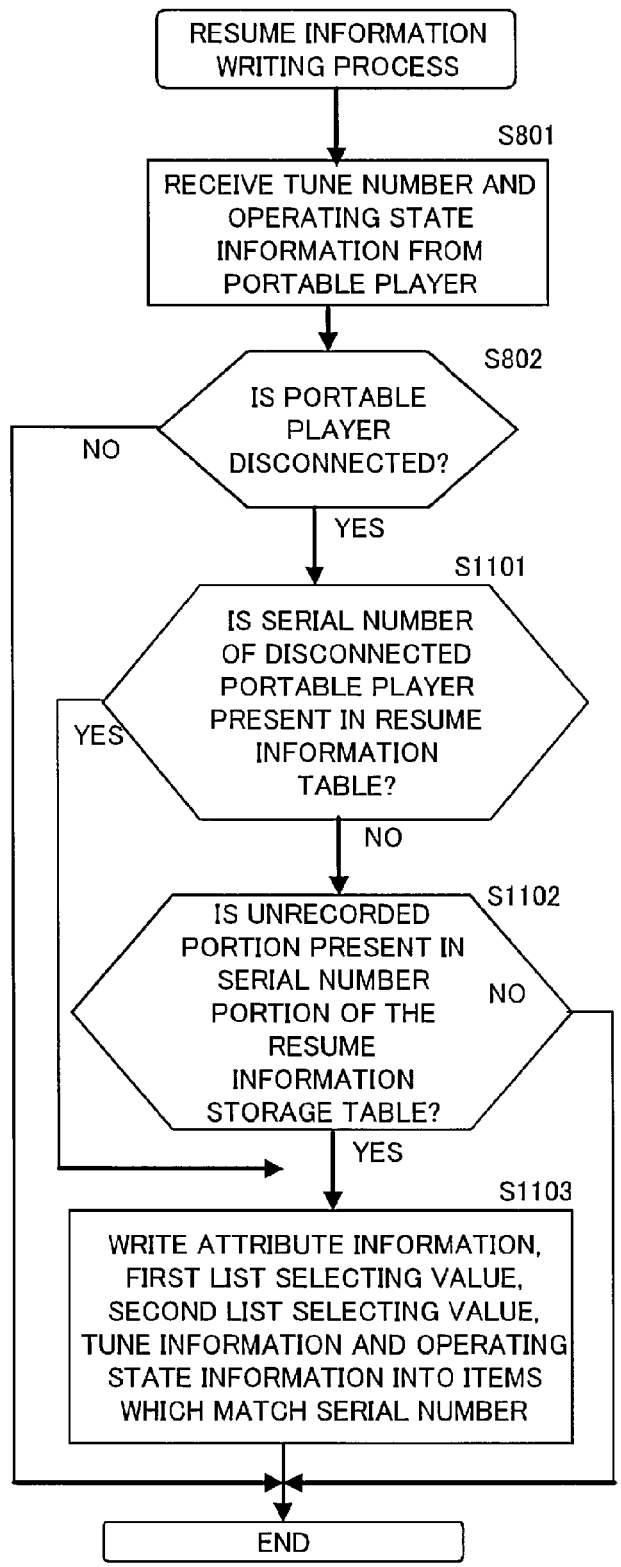
FIG. 11 is a flowchart illustrating the resume information writing process.

With reference to FIG. 11, the resume information writing process of this embodiment is explained, but like members are designated by like reference numbers in FIG. 8, and the explanation thereof is omitted. When the portable player 11 is connected to the battery charger 300, the microcomputer processing section 301 receives the serial number from the portable player 11 so as to temporarily store it into the RAM 302 (not shown). When the portable player is disconnected (YES at S802), the microcomputer processing section 302 determines whether the serial number which matches the serial number of the disconnected portable player 11 (the serial number stored in the RAM) is stored in the resume information table 302 (S1101). When the matched serial number is stored in the resume information table 302B, the resume information is written into respective items related with the serial number (S1103). On the other hand, when the matched serial number is not stored in the resume information table 302B (NO at S1101), the microcomputer processing section 302 determines whether an unrecorded portion is present in the item of the serial number in the resume information table 302B (S1102). When the unrecorded portion is present, the sequence goes to S1103, and the microcomputer processing section 301 records the serial number stored in the RAM 302 into the resume information table 302B, and writes the resume information into the respective items related with the serial number. When the unrecorded portion is not present, the resume information is not written and the process is ended.

Figure 12:
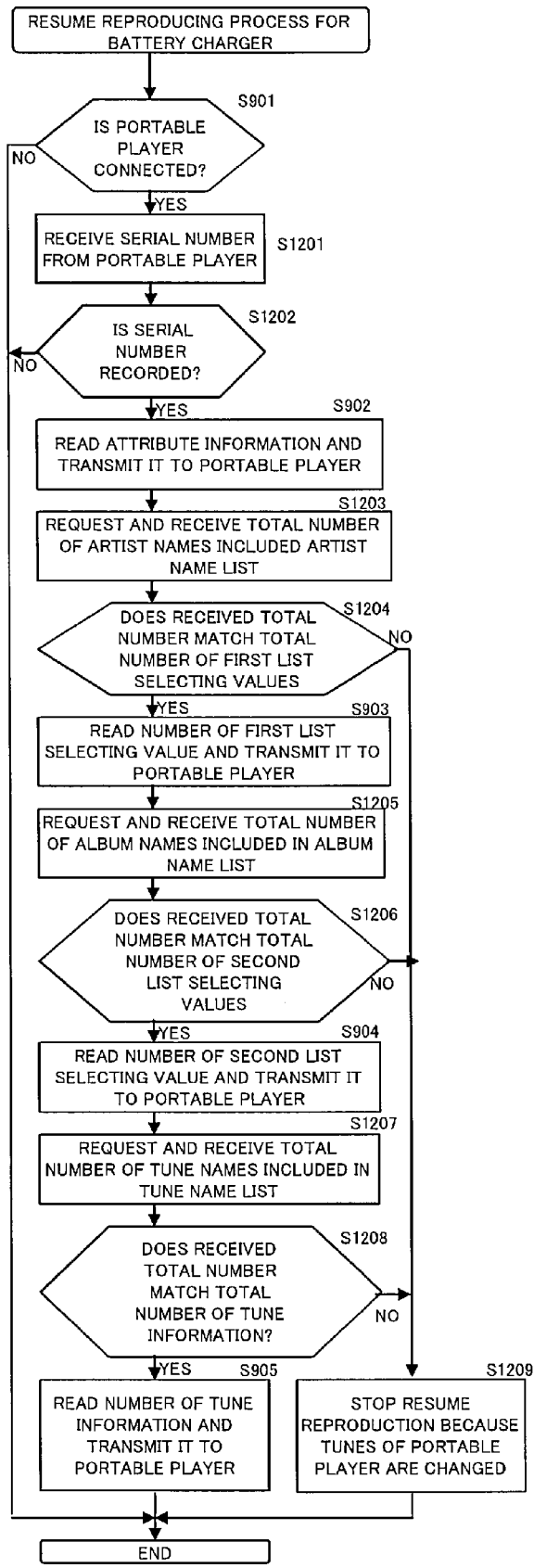
FIG. 12 is a flowchart illustrating the resume reproducing process of the battery charger.

With reference to FIG. 12, the resume reproducing process in this embodiment is explained, but like processes are designated by like reference numerals in FIG. 9, and the explanation thereof is omitted. When the portable player 11 is connected (YES at S901), the microcomputer processing section 301 receives the serial number from the portable player 11, and temporarily stores it into the RAM 302 (S1201). The microcomputer processing section 301 determines whether the serial number which matches the serial number of the connected portable player 11 is stored in the resume information table 302B (S1202). When it is not stored therein, the resume information about the connected portable player is not present, and thus resume reproduction is not carried out so that the process is ended. When the serial number is stored therein (YES at S1202), the microcomputer processing section 301 reads the resume information about the respective items related with the serial number of the connected portable player 11 so as to execute the following process. The microcomputer processing section 301 reads attribute information from the items which match the serial number in the resume information table so as to transmit it to the portable player 11 (S902).

The microcomputer processing section 301 requests the portable player 11 to transmit the total number of artist names included in the list (for example, the artist name list) specified by the attribute information (S1203). The portable player 11 transmits the total number of the artist names included in the artist name list to the battery charger 300. The microcomputer processing section 301 acquires the total number and temporarily stores the total number in the RAM 302 (S1203). The microcomputer processing section 301 determines whether the total number of the artist names received from the portable player 11 matches the total number stored as the first list selecting value in the resume information table 302B (S1204). When they do not match, a determination is made that the tunes stored in the portable player 11 are changed. For this reason, the resume play process is not executed, and the process is ended (S1209). When they match, the sequence goes to S903.

The microcomputer processing section 301 reads the number of the first list selecting value from the resume information table 302B, and transmits it to the portable player 11 (S903). The microcomputer processing section 301 requests the total number of album names included in the list (for example, album name list) specified by the first list selecting value (S1205). The portable player 11 transmits the total number of the album names included in the album name list to the battery charger 300, and the battery charger 300 acquires the total number so as to temporarily store it in the RAM (S1205). The microcomputer processing section 301 determines whether the total number of the album names received from the portable player 11 matches the total number stored as the second list selecting value in the resume information table 302B (S1206). When they do not match, the tunes stored in the portable player 11 are changed. For this reason, the resume reproducing process is not executed, and the process is ended (S1209). When they match, the sequence goes to S904.

The microcomputer processing section 301 reads the number of the second list selecting value from the resume information table 302B and transmits it to the portable player 11 (S904). The microcomputer processing section 301 requests the total number of the tunes included in the tune name list specified by the second list selecting value (S1207). The portable player 11 transmits the total number of the tune names included in the tune name list to the battery charger 300, and the battery charger 300 acquires the total number so as to temporarily store it in the RAM (S1207). The microcomputer processing section 301 determines whether the total number of the tune names received from the portable player 11 matches the total number stored in the tune information of the resume information table 302B (S1208). When they do not match, the tunes recorded in the portable player are changed. For this reason, the resume reproducing process is not executed, and the process is ended (S1209). When they match, the number stored in the resume information table 302B is transmitted to the portable player 11, and the portable player selects the tune with the specified number so as to start the reproduction.

Still another preferable embodiment of the present invention is explained below. In this embodiment, the lists and the numbers (order) for specifying tunes are not stored in the resume information table, but the contents information are stored. As a result, even in the case where tunes are added to the portable player and the order in the list is changed, the tune can be specified and the portable player can be allowed to start the reproduction of the specified tune as long as the tune which is being reproduced just before the connection is released at the last time is not deleted.

A resume information table 302C to be used in this embodiment is shown in FIG. 13. As shown in FIG. 13, for example, an artist name, an album name and a tune name are written into items: the first list selecting value; the second list selecting value; and the tune information, respectively. When the portable player 11 is connected to the battery charger 300, the contents information stored in the first list selecting value, the second list selecting value and the tune information is transmitted from the resume information table 302C to the portable player 11. The portable player 11 creates a tune name list based on the received first list selecting value and second list selecting value, and specifies the tunes based on the received tune information so as to start reproduction.

Figure 14:
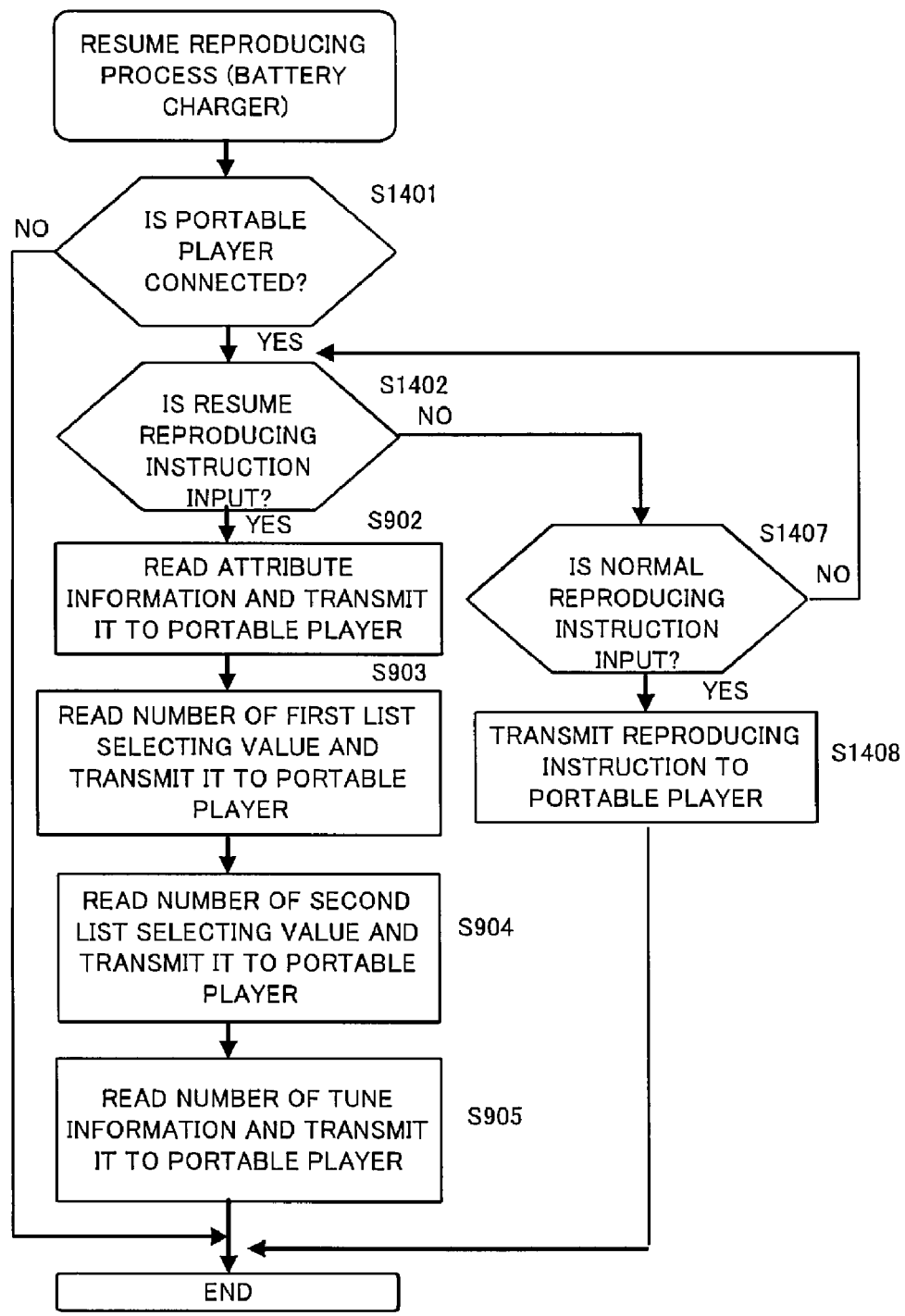
FIG. 14 is a flowchart illustrating the resume reproducing process of the battery charger.

Still another preferred embodiment of the present invention is explained below. In this embodiment, when the portable player 11 is connected to the battery charger 300, the reproducing instruction is not automatically transmitted to the portable player 11 based on the resume information 302A. When the user inputs the resume reproducing instruction, the portable player 11 is instructed to execute the resume reproduction based on the resume information table 302A. For example, the input section 308 has a resume reproducing button and a normal reproducing button, not shown. As shown in FIG. 14, In the case where the portable player 11 is connected to the battery charger 300 (YES at S1401), when the user operates the resume reproducing button so as to input the resume reproducing instruction (YES at S1402), the battery charger 300 instructs the portable player 11 to play the tune using the resume information read from the resume information table 302A (S902 to S905).

On the other hand, when a tune which is being reproduced with the portable player 11 not being connected to the battery charger 300 is desired to be played at the time when the portable player 11 is connected to the battery charger 300, the user operates the normal reproduce button so as to input the normal reproducing instruction (YES at S1407). In this case, the battery charger 300 transmits the reproducing instruction to the portable player 11 (S1408). When the portable player 11 receives the reproducing instruction, it reads the resume information from the resume information table 202A owned by itself so as to start the play. As a result, the portable player 11 can start to reproduce the tune which is stopped in the state that the portable player 11 is not connected to the battery charger 300.

In the case where the portable player 11 is connected to the battery charger 300 while the tune A is being reproduced, the reproduction of the tune A continues until the resume reproducing instruction is inputted. When the resume reproducing instruction is input (YES at S1402), the battery charger 300 instructs the portable player 11 to reproduce the tune using the resume information read from the resume information table 302A (S902 to S905).

Figure 15:
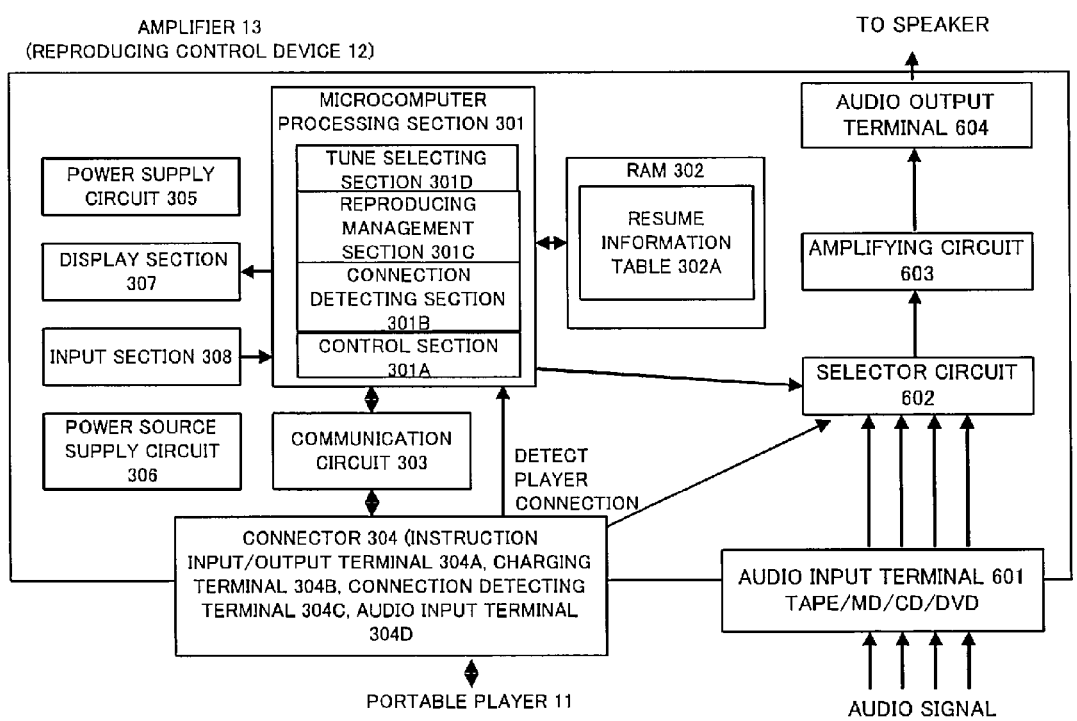
FIG. 15 is a diagram illustrating a constitution of an amplifier.

Still another preferred embodiment of the present invention is explained below. In this embodiment, the reproducing control device 12 is provided in the amplifier 13, and the portable player 11 is connected directly to the amplifier 13. As shown in FIG. 15, the amplifier 13 includes not only the respective members of the reproducing control device 12 but also an audio input terminal 601, a selector circuit 602, an amplifying circuit 603 and an audio output terminal 604. Audio is input from a plurality of reproducing devices (CD player, MD player and the like) into the audio input terminal 601. The selector circuit 602 selects one of audio input into the audio input terminal 601 and audio input from the portable player 11 via the audio input terminal 304D. The amplifying circuit 603 amplifies an audio signal. The audio output terminal 604 outputs the amplified audio signal to the speaker. Since the other part of the constitution is the same as that of the reproducing control device in the battery charger 300 of FIG. 3, the explanation thereof is omitted.

Figure 16:
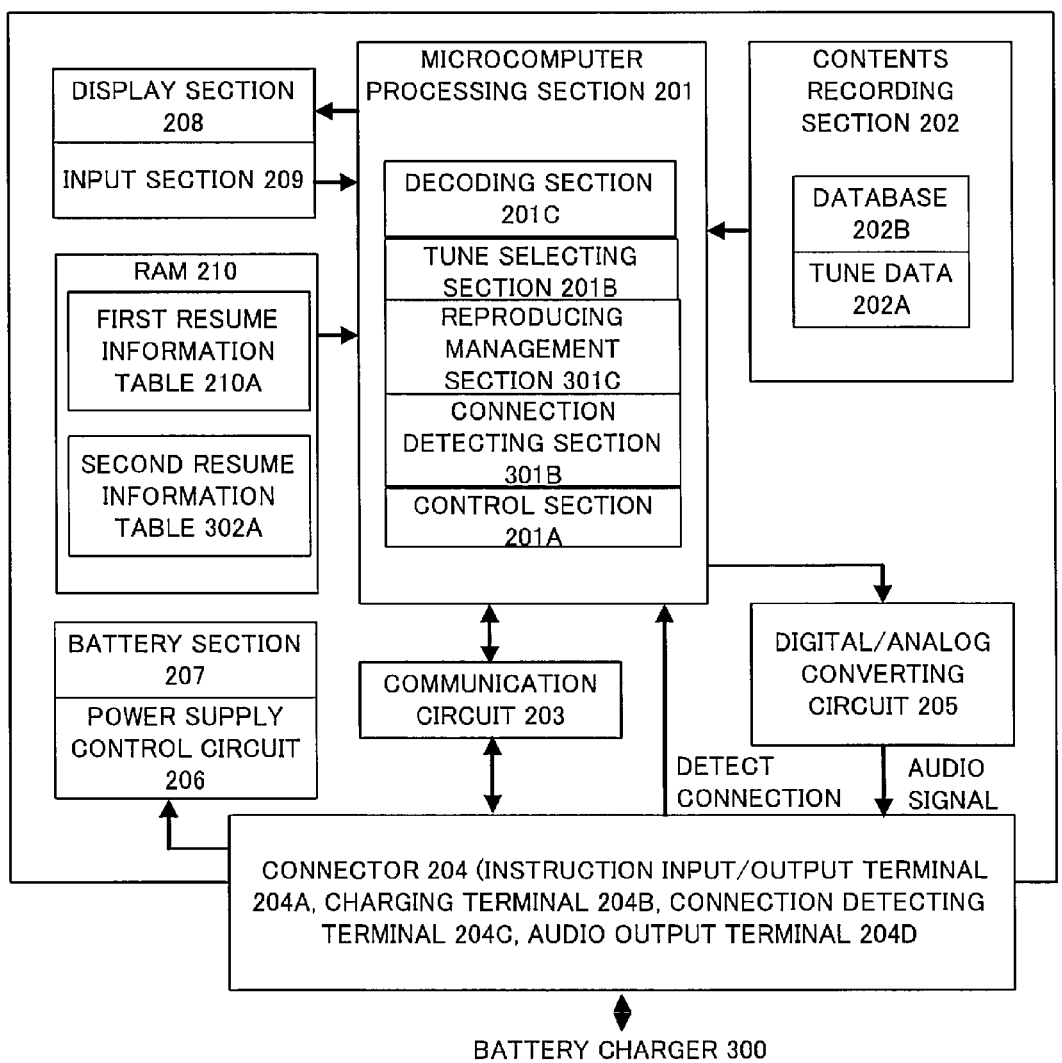
FIG. 16 is a diagram illustrating a constitution of the portable player.

Still another preferred embodiment of the present invention is explained below. In this embodiment, as shown in FIG. 16, the reproducing control device 12 is provided into the portable player 11, and the portable player 11 is connected to the amplifier 13 (via, for example, the battery charger 300). The portable player 11 further includes the connection detecting section 301B and the reproducing management section 301C as the functions of the reproducing control device 12. The RAM 210 stores a first resume information table 210A and a second resume information table 302A. The first resume information table 210A stores resume information about a tune stopped with the portable player 11 not being connected to the amplifier 13 or the battery charger 300 therein. The second resume information table 302A stores resume information about a tune being reproduced at the time when the connected portable player 11 and amplifier 13 or battery charger 300 are disconnected therein. As the second resume information table, one shown in FIG. 4 or FIG. 13 can be adopted.

Figure 7A:
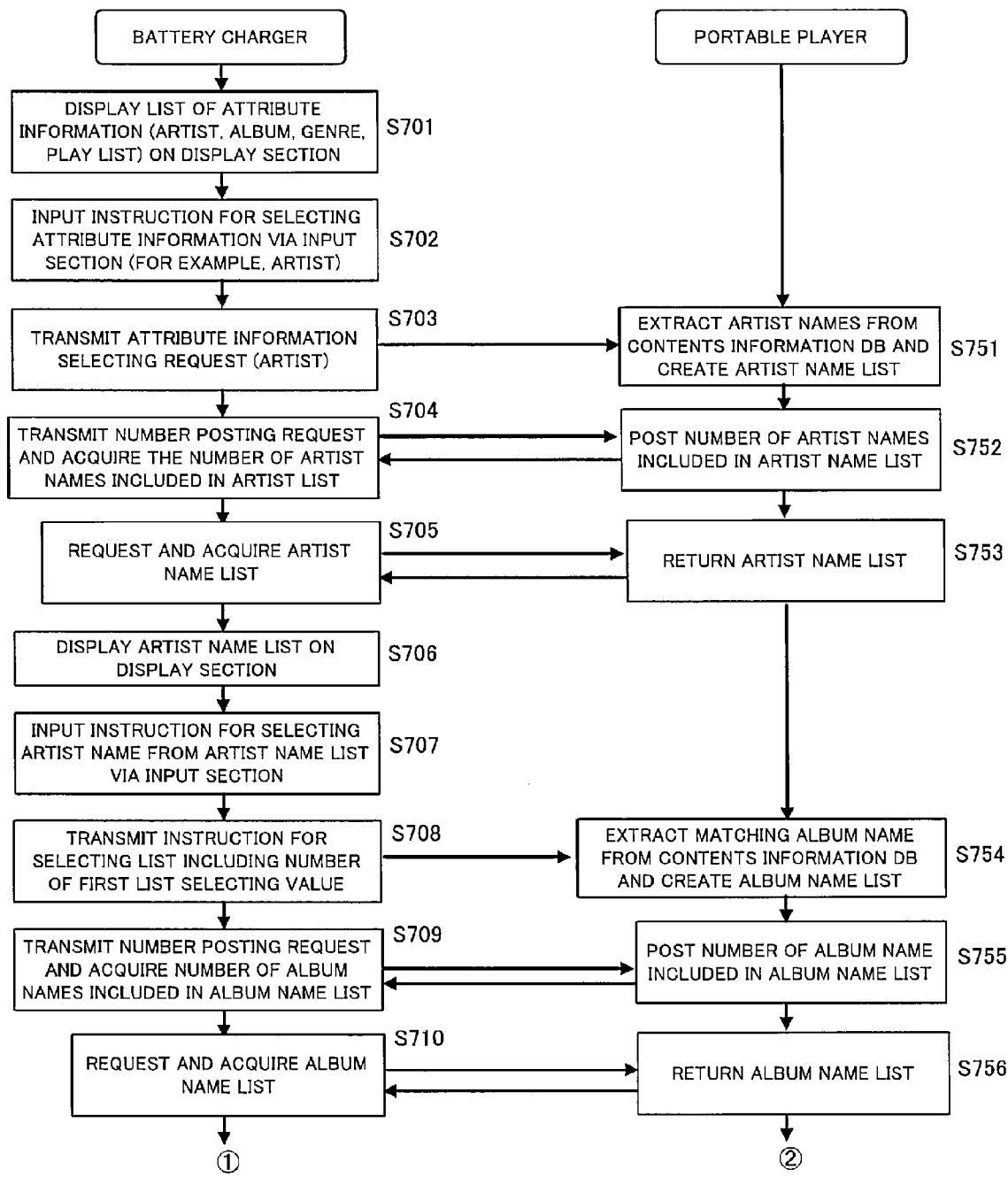
FIG. 7A is a flowchart illustrating a tune selecting process.
Figure 7B:
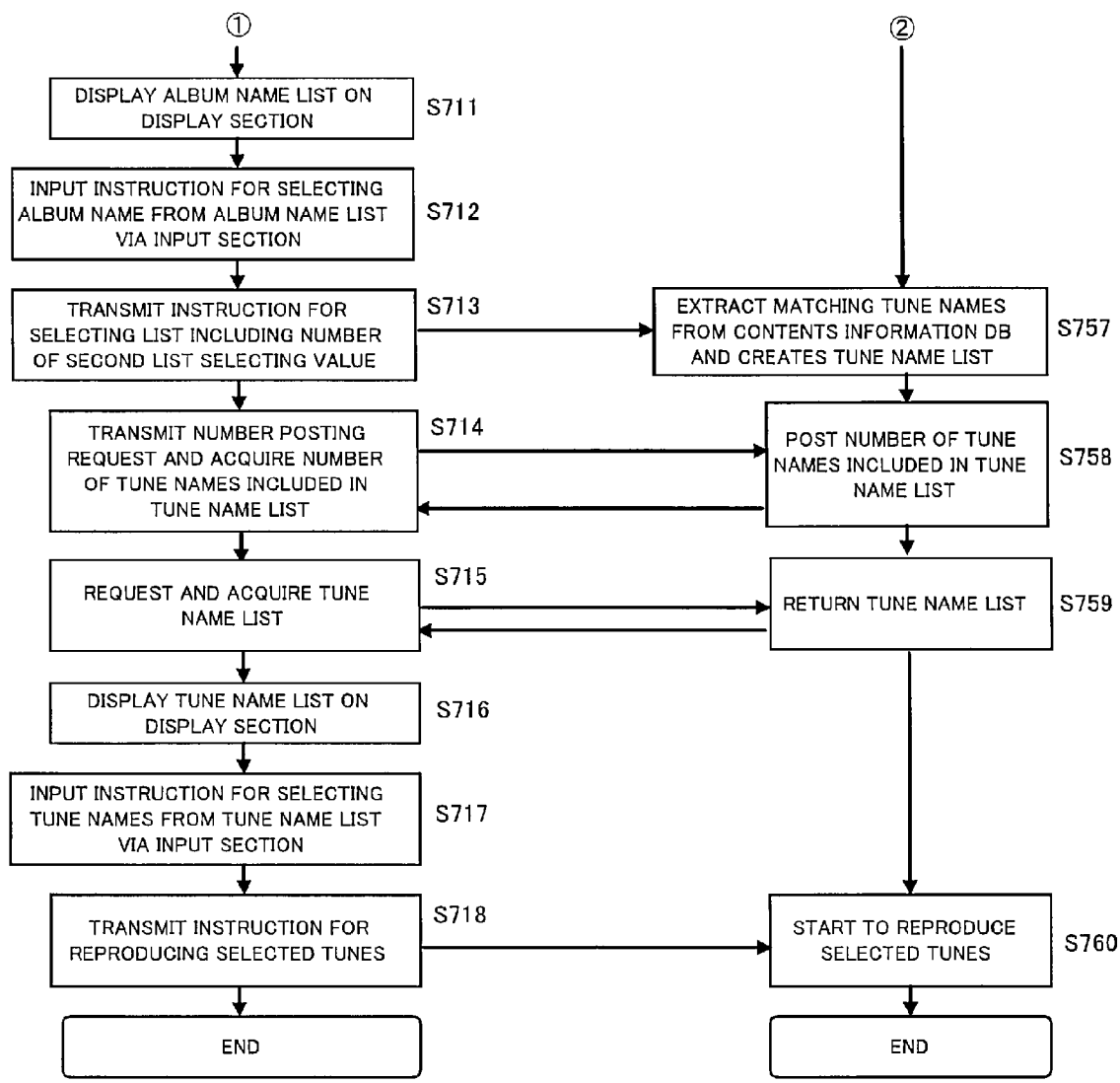
FIG. 7B is a flowchart illustrating the tune selecting process.

The portable player 11 temporarily stores the attribute information, the number of the first list selecting value, the number of the second list selecting value and the number of the tune information received from the battery charger 300 into the RAM 210 at the tune selecting process in FIGS. 7A and 7B. In the case where the connecting detecting section 301B detects that the portable player 11 is disconnected from the amplifier 13, the portable player 11 writes the resume information about the tune reproduced just before the disconnection into the second resume information table 302A (S802 and S803 in FIG. 8 are incorporated, the process at S801 is unnecessary). Thereafter, when the connection detecting section 301B detects that the portable player 11 is connected to the amplifier 13, the portable player 11 reads the resume information from the second resume information table 302A, and creates a tune list specified by the resume information. The portable player 11 starts to play the tune specified by the resume information (namely, S901 of FIG. 9 is changed into "Is portable player connected to amplifier?", and S902 to S905 are changed into "Respective resume information is read and reproduction is started"). The previous embodiments are incorporated as the other part of the constitution.

The preferred embodiments of the present invention are explained above, but the present invention is not limited to these embodiments. Only the resume information in the state that the portable player 11 is disconnected from the battery charger 300 is stored in the resume information table 210A of the portable player 11 in FIG. 2A. When the portable player 11 is disconnected from the battery charger 300, the portable player 11 may automatically start to reproduce a tune specified by the resume information stored in the resume information table 210A. The input/output terminal of the audio signal of the battery charger 300 may be a digital input/output terminal. The contents reproducing device may be a reproduce device that reproduces a portable recording medium without having the contents recording section, such as CD players, or a cellular phone. The present invention is provided in a form of a computer program of the reproducing control device for allowing a computer to perform the above operations, and the program can be installed into PC.

What is claimed is:

1. A reproducing control device, comprising:
    a connecting unit that is connected to a contents reproducing device which reproduces content selected from a plurality of contents;
    a receiving unit that receives the reproduced content from the contents reproducing device;
    a resume information storage unit that stores resume information about the content to be started to be reproduced with the contents reproducing device being connected to the connecting unit;
    a connection determining unit that determines whether the connecting unit is connected to the contents reproducing device;
    a writing unit that writes the resume information about the content reproduced just before the contents reproducing device is disconnected from the connecting unit into the resume information storage unit; and
    an instructing unit that, when the connection determining unit determines that the connecting unit is connected to the contents reproducing device, reads the resume information stored in the resume information storage unit so as to transmit an instruction for reproducing content specified by the resume information to the contents reproducing device.

2. The reproducing control device according to claim 1, wherein
    the connection determining unit further determines whether the connecting unit is disconnected from the contents reproducing device,
    when the connection determining unit determines that the connecting unit is disconnected from the contents reproducing device, the writing unit writes the resume information into the resume information storage unit.

3. The reproducing control device according to claim 1, further comprising:
    an input unit that inputs a resume reproducing instruction therein,
    wherein when the connection determining unit determines that the connecting unit is connected to the contents reproducing device and the resume reproducing instruction is input into the input unit, the instructing unit transmits the reproducing instruction of the content specified by the resume information to the contents reproducing device.

4. The reproducing control device according to claim 1, wherein
    the resume information storage unit includes contents specifying information for specifying the content and list specifying information for specifying a list including the contents as the resume information,
    the instructing unit reads the contents specifying information and the list specifying information from the resume information storage unit so as to transmit them to the contents reproducing device.

5. The reproducing control device according to claim 1, further comprising:
    a change determining unit that determines whether the contents recorded in the contents reproducing device connected to the connecting unit are changed from contents recorded in the contents reproducing device just before the connection is released,
    wherein when the change determining unit determines that the contents are not changed, the instructing unit transmits the instruction for reproducing the content specified by the resume information to the contents reproducing device, wherein when the change determining unit determines that the contents are changed, the instructing unit does not transmit the instruction for reproducing the content specified by the resume information to the contents reproducing device.

6. The reproducing control device according to claim 1, wherein
the resume information storage unit can store identification information about one or a plurality of contents reproducing device(s) and the resume information related with the identification information therein, the reproducing control device further comprising:
an identification information acquiring unit that acquires identification information about the contents reproducing device connected to the connecting unit from the contents reproducing device; and
an identification information determining unit that determines whether the acquired identification information matches the identification information stored in the resume information storage unit,
wherein when the identification information determining unit determines that two pieces of the information match, the instructing unit transmits an instruction for reproducing the content specified by the resume information related with the matched identification information to the contents reproducing device.

7. A battery charger for contents reproducing device, comprising:
the reproducing control device according to claim 1;
a power source supplying circuit that supplies a power supply voltage to the contents reproducing device; and
a transmitting unit that transmits the contents received by the receiving unit to an amplifier to be connected to the outside.

8. An amplifier, wherein the contents includes audio, the amplifier comprising:
the reproducing control device according to claim 1; and
an amplifying unit that amplifies the audio received by the receiving unit.

9. A reproducing control program, stored on a non-transitory machine readable medium, which is an operating program of a reproducing control device capable of being connected to a contents reproducing device for reproducing content selected from a plurality of contents, the program when executed by a computer causing the computer to execute:

a receiving step of receiving the reproduced contents from the contents reproducing device;
a connection determining step of determining whether the reproducing control device is connected to the contents reproducing device;
a writing step of writing resume information about the content reproduced just before the contents reproducing device is disconnected from the reproducing control device into a resume information table;
a reading step of, when the determination is made that the reproducing control device is connected to the contents reproducing device, reading the resume information stored in the resume information table; and
an instructing step of transmitting an instruction for reproducing content specified by the read resume information to the contents reproducing device.

10. A contents reproducing device, comprising:
a reproducing unit that reproduces content selected from a plurality of contents;
a connecting unit that is connected to an external device as a transmission destination of the contents;
a transmitting unit that transmits the reproduced contents to the external device;
a first resume information storage unit that stores resume information about content to be started to be reproduced with the connecting unit being disconnected from the external device therein;
a second resume information storage unit that stores resume information about content to be started to be reproduced with the connecting unit being connected to the external device;
a connection determining unit that determines whether the connecting unit is connected to the external device; and
a writing unit that writes resume information about content being reproduced by the reproducing unit just before the connecting unit is disconnected from the external device into the second resume information storage unit,
wherein when the connection determining unit determines that the connecting unit is connected to the external device, the reproducing unit reads the resume information stored in the second resume information storage unit and starts to reproduce content specified by the resume information.

* * * * *